(12) United States Patent
Ito et al.

(10) Patent No.: US 12,059,790 B2
(45) Date of Patent: Aug. 13, 2024

(54) WORKING MACHINE

(71) Applicant: Makita Corporation, Anjo (JP)

(72) Inventors: Ryosuke Ito, Anjo (JP); Norihiro Ushio, Anjo (JP); Akira Ojima, Anjo (JP); Yoshiaki Kashino, Anjo (JP)

(73) Assignee: MAKITA CORPORATION, Anjo (JP)

( * ) Notice: Subject to any disclaimer, the term of this patent is extended or adjusted under 35 U.S.C. 154(b) by 298 days.

(21) Appl. No.: 17/684,859

(22) Filed: Mar. 2, 2022

(65) Prior Publication Data
US 2022/0288762 A1    Sep. 15, 2022

(30) Foreign Application Priority Data

Mar. 9, 2021 (JP) ................................ 2021-037069

(51) Int. Cl.
*B25F 5/00*    (2006.01)
*H02K 5/18*    (2006.01)
*H02K 7/14*    (2006.01)
*H02K 9/06*    (2006.01)
*H02K 11/33*    (2016.01)

(52) U.S. Cl.
CPC ............... *B25F 5/008* (2013.01); *H02K 5/18* (2013.01); *H02K 7/145* (2013.01); *H02K 9/06* (2013.01); *H02K 11/33* (2016.01); *H02K 2211/03* (2013.01)

(58) Field of Classification Search
None
See application file for complete search history.

(56) References Cited

U.S. PATENT DOCUMENTS

| 10,511,208 | B2* | 12/2019 | Hara | H02K 7/04 |
| 11,766,773 | B2* | 9/2023 | Tadokoro | B25F 5/02 310/50 |
| 2020/0338780 | A1 | 10/2020 | Watanabe et al. | |
| 2022/0288762 | A1* | 9/2022 | Ito | H02K 7/145 |
| 2022/0305575 | A1* | 9/2022 | Ukai | B23D 59/006 |
| 2023/0107123 | A1* | 4/2023 | Ishikawa | H02K 11/28 310/68 R |

FOREIGN PATENT DOCUMENTS

JP        2020-179523 A        11/2020

* cited by examiner

*Primary Examiner* — Hwei-Siu C Payer
(74) *Attorney, Agent, or Firm* — Sughrue Mion, PLLC (57) ABSTRACT

A working machine may include: a fan configured to generate an air flow inside a first space; a control unit disposed inside the first space; a partition wall separating the first space from a second space; a first aperture communicating the first space with the second space; and a rib extending from the partition wall and forming an air passage in which the air flow passes, wherein the air passage is positioned between the control unit and the rib. The control unit may include a case housing a circuit board. The control unit may include a first surface facing the rib. In a first direction perpendicular to the first surface, the rib and the first surface may at least partially overlap with each other. A distance between the rib and the first surface may be smaller than a thickness of the case in the first direction.

12 Claims, 8 Drawing Sheets

WORKING MACHINE

CROSS-REFERENCE TO RELATED APPLICATION

This application claims priority to Japanese Patent Application No. 2021-37069 filed on Mar. 9, 2021, the entire contents of which are hereby incorporated by reference into the present application.

TECHNICAL FIELD

The disclosure herein relates to a working machine.

BACKGROUND

Japanese Patent Application No. 2020-179523 describes a working machine. The working machine includes a motor configured to drive a working part, a fan configured to be driven by the motor and generate an air flow inside a first space, a control unit disposed inside the first space, a partition wall separating the first space from a second space, and a first aperture defined in the partition wall and communicating the first space with the second space. The control unit includes a circuit board configured to control actuation of the motor and a case housing the circuit board.

SUMMARY

In the working machine above, the circuit board generates heat when controlling the actuation of the motor. Thus, the entire control unit generates heat. When the fan rotates, air flows into the first space through the first aperture. By this air flowing along the control unit, the control unit is cooled. In recent years, as circuit boards have been required to allow even a greater amount of current to flow therethrough, the amount of heat generated by the circuit boards increases, and thus it is desired to enhance a cooling capability for control units. The disclosure herein provides a technique that enhances a cooling capability for a control unit.

The disclosure herein discloses a working machine. The working machine may comprise a motor configured to drive a working part; a fan configured to be driven by the motor and generate an air flow inside a first space; a control unit disposed inside the first space; a partition wall separating the first space from a second space; a first aperture defined in the partition wall and communicating the first space with the second space; and a rib extending from the partition wall inside the first space and defining an air passage in which the air flow passes, wherein the air passage is positioned between the control unit and the rib. The control unit may comprise a circuit board configured to control actuation of the motor and a case housing the circuit board. The control unit may include a first surface facing the rib. In a first direction perpendicular to the first surface, the rib and the first surface at least partially overlap with each other. A distance between the rib and the first surface is smaller than a thickness of the case in the first direction.

In the configuration above, when the fan rotates, air in the second space flows into the first space through the first aperture. Then, the air flows to the motor through the air passage between the rib and the first surface of the control unit. According to the configuration above, the distance between the rib and the first surface is smaller than the thickness of the case in the first direction. This configuration can thus increase the flow velocity of the air flowing between the rib and the first surface as compared to a configuration in which the distance between the rib and the first surface is larger than the thickness of the case in the first direction. Since heat transference is increased, a cooling capability for the control unit can be enhanced.

DETAILED DESCRIPTION

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the control unit may further comprise a heat dissipating part for heat dissipation. The heat dissipating part may be exposed to the air passage.

In the configuration above, heat of the control unit is dissipated to the air flowing through the air passage via the heat dissipating part. Thus, the configuration can enhance the cooling capability for the control unit as compared to a configuration in which the control unit does not comprise the heat dissipating part.

In one or more embodiments, the heat dissipating part may have a concave-convex shape.

This configuration provides a large contact area between the air and the heat dissipating part as compared to a configuration in which the heat dissipating part does not have a concave-convex shape, and thus can enhance the cooling capacity for the control unit.

In one or more embodiments, the rib may be disposed substantially parallel to the first surface.

For example, a configuration in which the rib is inclined toward the first surface cannot provide a long air passage because the length of the rib needs to be adjusted such that the distance between the rib and the first surface does not fall below a certain distance. To the contrary, in a configuration in which the rib is inclined away from the first surface, the distance between the rib and the first surface is gradually increased in the first direction. This decreases the flow velocity of the air flowing in through the first aperture as the air flows through the air passage. Since the rib is disposed substantially parallel to the first surface, the configuration above can prevent the decrease in the flow velocity of the air flowing in through the first aperture and provide a long air passage.

In one or more embodiments, the rib may comprise a facing portion that faces ⅓ or more of an area of the first surface.

In the configuration above, the first surface can be cooled over a large area by the air flowing in through the first aperture.

In one or more embodiments, the rib may be integral with the partition wall.

The configuration above allows for a reduced number of components as compared to a configuration in which the rib is separate from the partition wall.

In one or more embodiments, the control unit may be disposed along a plane substantially perpendicular to the partition wall.

If the control unit is not disposed along a plane substantially perpendicular to the partition wall, the air flowing in through the first aperture has to make a turn to flow through the air passage between the rib and the first surface. This turn of air flow reduces the flow velocity of the air. In the configuration above, the air flowing in through the first aperture does not need to make a turn to flow through the air passage between the rib and the first surface. Thus, it is possible to prevent reduction in the flow velocity of the air.

In one or more embodiments, the second space may be a space outside of the working machine.

The configuration above allows relatively low-temperature air outside of the working machine to flow into the first space through the first aperture. Thus, the cooling capability for the control unit can be enhanced.

In one or more embodiments, a width of the first aperture may be smaller than the thickness of the case with respect to the first direction.

There may be foreign matters in areas where the working machine is used. In the configuration above, the width of the first aperture is smaller than the thickness of the case in the first direction, and thus it is possible to prevent entry of foreign matters into the first space through the first aperture.

In one or more embodiments, the working machine may further comprise a second aperture defined in the partition wall and communicating the first space with the second space. The rib may be connected with a portion of the partition wall between the first aperture and the second aperture.

For example, in a configuration in which only the first aperture is defined in the partition wall, the air flowing in through the first aperture cools the control unit, and then the air warmed as a result of the cooling of the control unit flows toward the motor. Thus, the motor may not be sufficiently cooled. In the configuration above, the air flowing in through the second aperture flows toward the motor without cooling the control unit since the rib is disposed between the first aperture and the second aperture. Thus, it is possible to enhance the cooling capability for the control unit by the air flowing in through the first aperture and also enhance the cooling capability for the motor by the air flowing in through the second aperture.

In one or more embodiments, the working machine may further comprise a guide bar. The working part may comprise a sprocket configured to be rotated by the motor and a saw chain configured to move along a periphery of the guide bar as the sprocket rotates.

In the configuration above, when the saw chain cuts an object, a large load is applied to the motor and a large current flows through the circuit board. Accordingly, the circuit board generates a large amount of heat, and thus the control unit is likely to have a high temperature. The above configuration allows for a constant contact between the air with fast flow velocity and the first surface of the case of the control unit with a high temperature. Since heat transference is increased, the cooling capability can be enhanced for the control unit with a high temperature.

EMBODIMENTS

Figure 1:
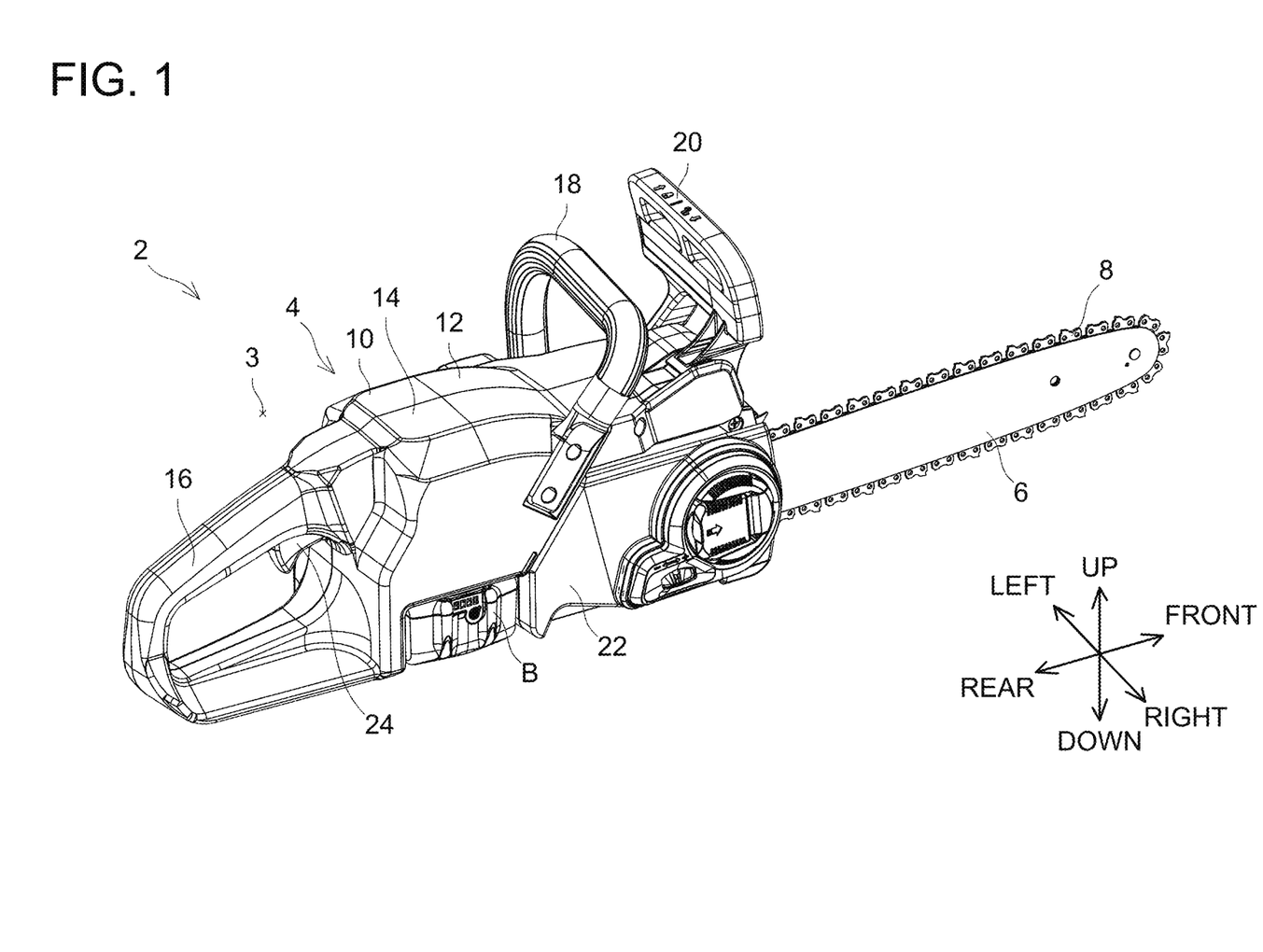
FIG. 1 is a perspective view of a working machine 2 according to an embodiment, as viewed from the rear right side.

Referring to FIGS. 1 to 8, a working machine 2 according to an embodiment is described. The working machine 2 is a chain saw. As illustrated in FIG. 1, the working machine 2 comprises a body 4, a guide bar 6, and a saw chain 8. The guide bar 6 has an elongated plate shape. The guide bar 6 is attached to the body 4 to project forward from the body 4. The saw chain 8 comprises a plurality of cutters which are linked with each other. The saw chain 8 is attached to the periphery of the guide bar 6. A battery pack B is detachably attached to the body 4. The working machine 2 cuts objects, such as timbers, by moving the saw chain 8 along the periphery of the guide bar 6 using electric power supplied from the battery pack B. When the working machine 2 is placed on a plane P (see FIG. 2) such as the ground, a direction perpendicular to the plane P is termed an up-down direction, a direction defined by a longitudinal direction of the guide bar 6 projected on the plane P is termed a front-rear direction, and a direction perpendicular to the up-down direction and the front-rear direction is termed a right-left direction.

The body 4 comprises a housing 10, a front handle 18, a hand guard 20, and a sprocket cover 22. The housing 10 comprises a left housing 12 that defines the outer shape of a left-half surface of the housing 10 and a right housing 14 that defines the outer shape of a right-half surface of the housing 10. A rear handle 16 grippable by a hand of an operator is located at a rear portion of the housing 10. A trigger switch 24, by which the operator moves the saw chain 8, is disposed on the rear handle 16.

The front handle 18 extends upward from a left wall of the left housing 12, bends and extends rightward, bends and extends downward and then connects to a right wall of the right housing 14. The operator can handle the working machine 2 by gripping the rear handle 16 with one hand and gripping the front handle 18 with the other hand.

The hand guard 20 is attached to an upper front portion of the housing 10. When the hand guard 20 is pushed forward while the saw chain 8 is moving along the periphery of the guide bar 6, the movement of the saw chain 8 is braked.

The sprocket cover 22 is attached to the right wall of the right housing 14. A rear portion of the guide bar 6 is interposed between the sprocket cover 22 and the right housing 14.

Figure 2:
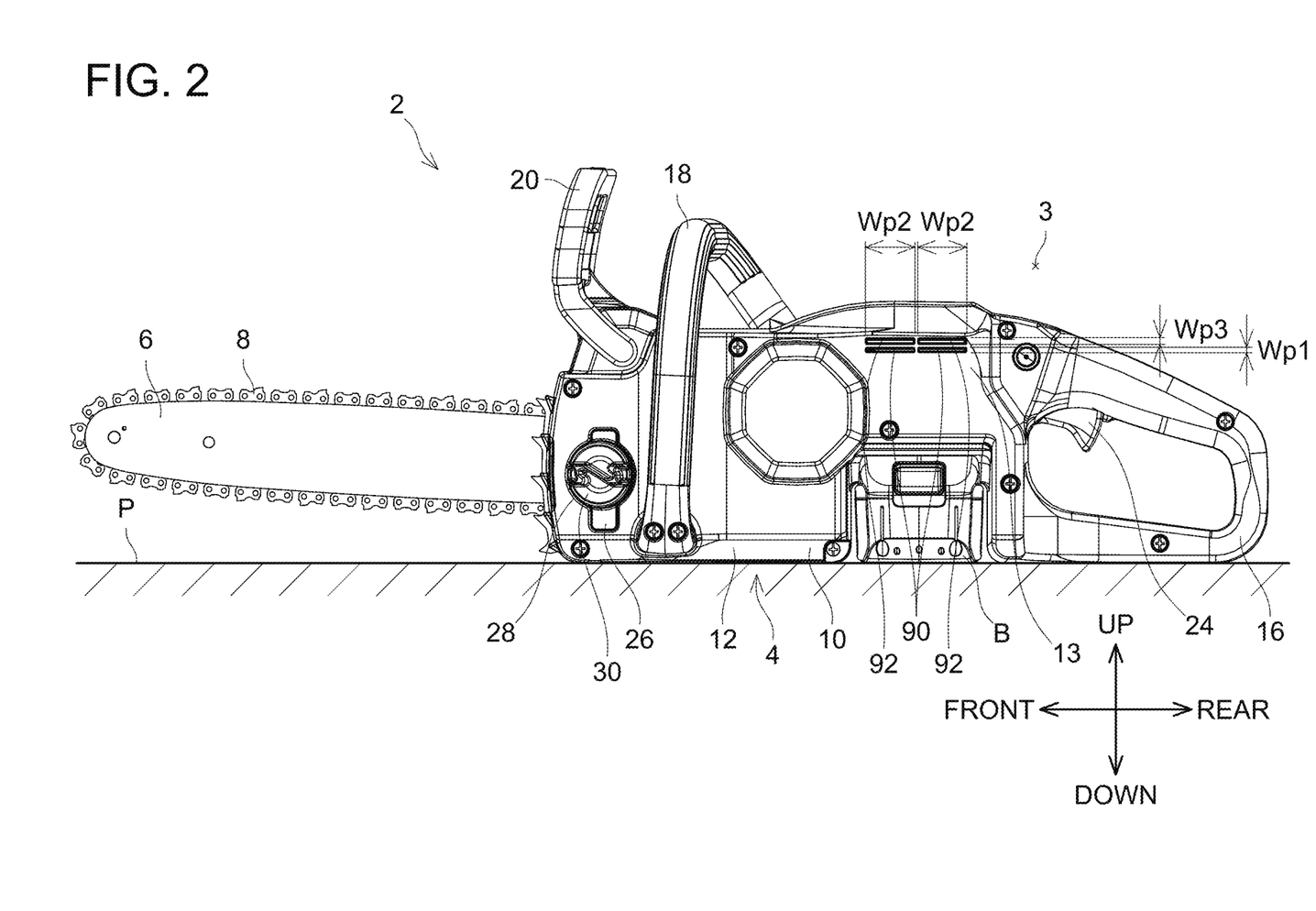
FIG. 2 is a left side view of the working machine 2 according to the embodiment.

As illustrated in FIG. 2, an oil filler hole 28 of an oil tank 26 projects from the left wall of the left housing 12 toward the outside of the housing 10. A cap 30 is attached to the oil filler hole 28. The oil tank 26 reserves a lubricant for the saw chain 8.

Figure 3:
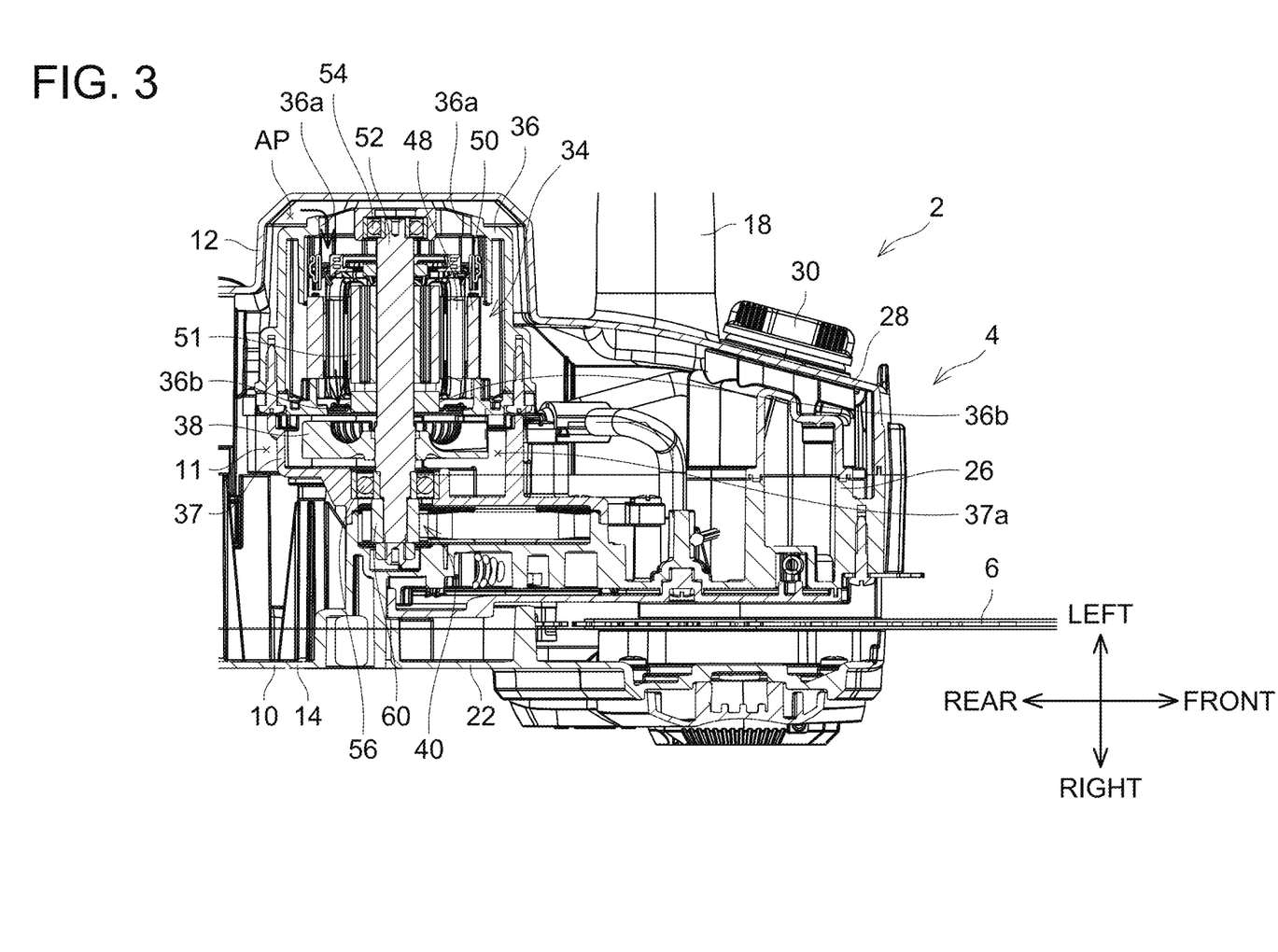
FIG. 3 is a horizontal cross-sectional view of the working machine 2 according to the embodiment in the vicinity of a motor 34.
Figure 4:
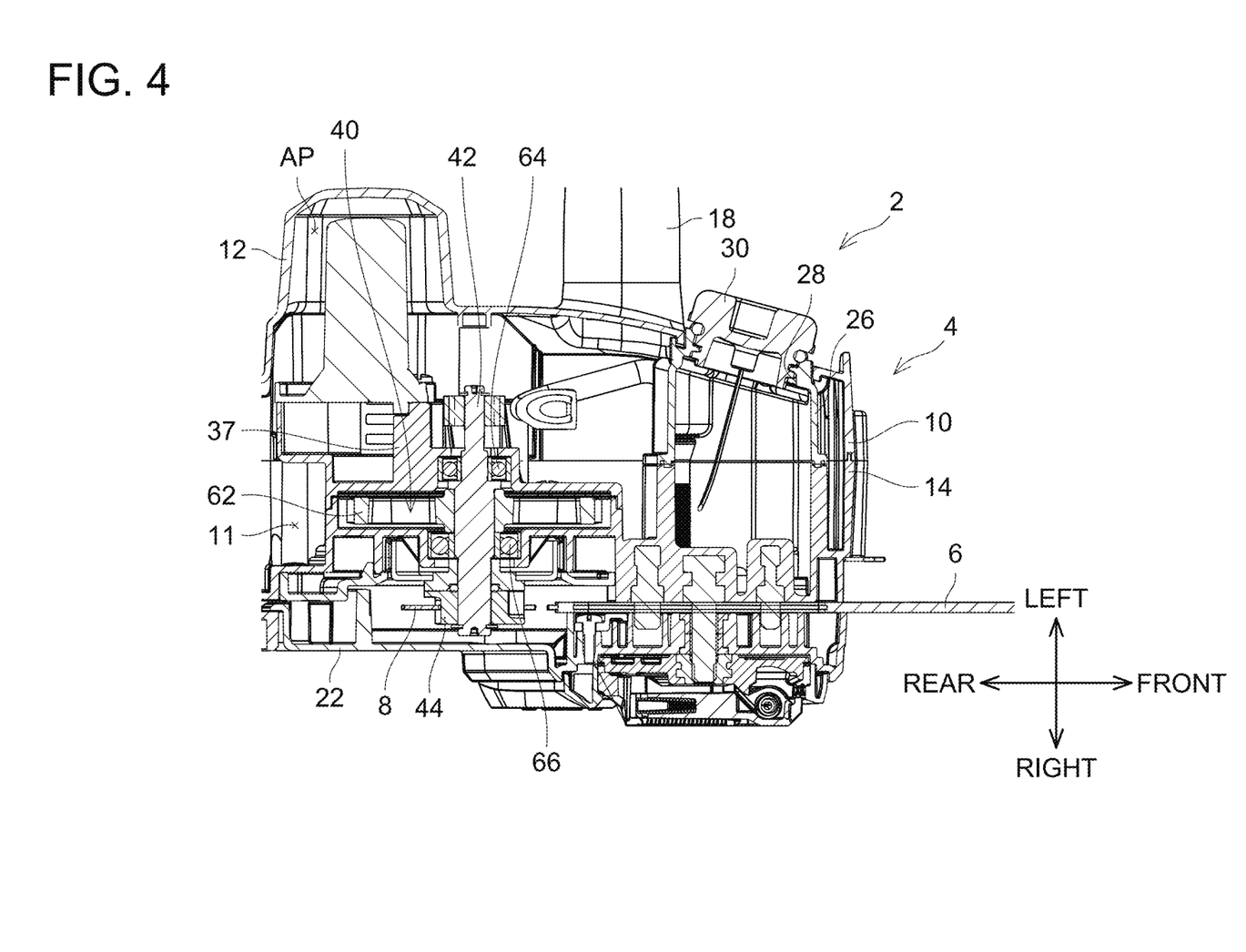
FIG. 4 is a horizontal cross-sectional view of the working machine 2 according to the embodiment in the vicinity of a transmission mechanism 40.

As illustrated in FIGS. 3 and 4, the working machine 2 comprises a motor 34, a motor housing 36, a cover member 37, a fan 38, a transmission mechanism 40, an intermediate shaft 42, and a sprocket 44. The motor 34, the motor housing 36, the fan 38, the cover member 37, and the transmission mechanism 40 are housed inside the housing 10. Hereinafter, a space inside the housing 10 is termed an inner space 11. As illustrated in FG. 3, the motor 34 is positioned rearward of the oil tank 26. The motor 34 is a DC brushless motor of inner rotor type. In a variant, the motor 34 may be a motor of outer rotor type, a brush motor, or an AC motor. The motor 34 comprises a stator 50 on which a coil 48 is wound, a rotor 51 disposed inside the stator 50 and including a permanent magnet, and a motor shaft 52 extending through the center of the rotor 51 and fixed to the rotor 51. The coil 48 is electrically connected to a control unit 70 (see FIG. 7). The stator 50 is fixed to the motor housing 36. The motor housing 36 is fixed to the housing 10. First air holes 36a are defined in a left wall of the motor housing 36, and second air holes 36b is defined in a right wall of the motor housing 36. The cover member 37 is attached to the right wall of the motor housing 36. The motor shaft 52 is disposed along the right-left direction. The motor shaft 52 is supported by the motor housing 36 via a bearing 54 such that the motor shaft 52 is rotatable with respect to the motor housing 36 and is also supported by the cover member 37 via a bearing 56 such that the motor shaft 52 is rotatable with respect to the cover member 37.

Figure 5:
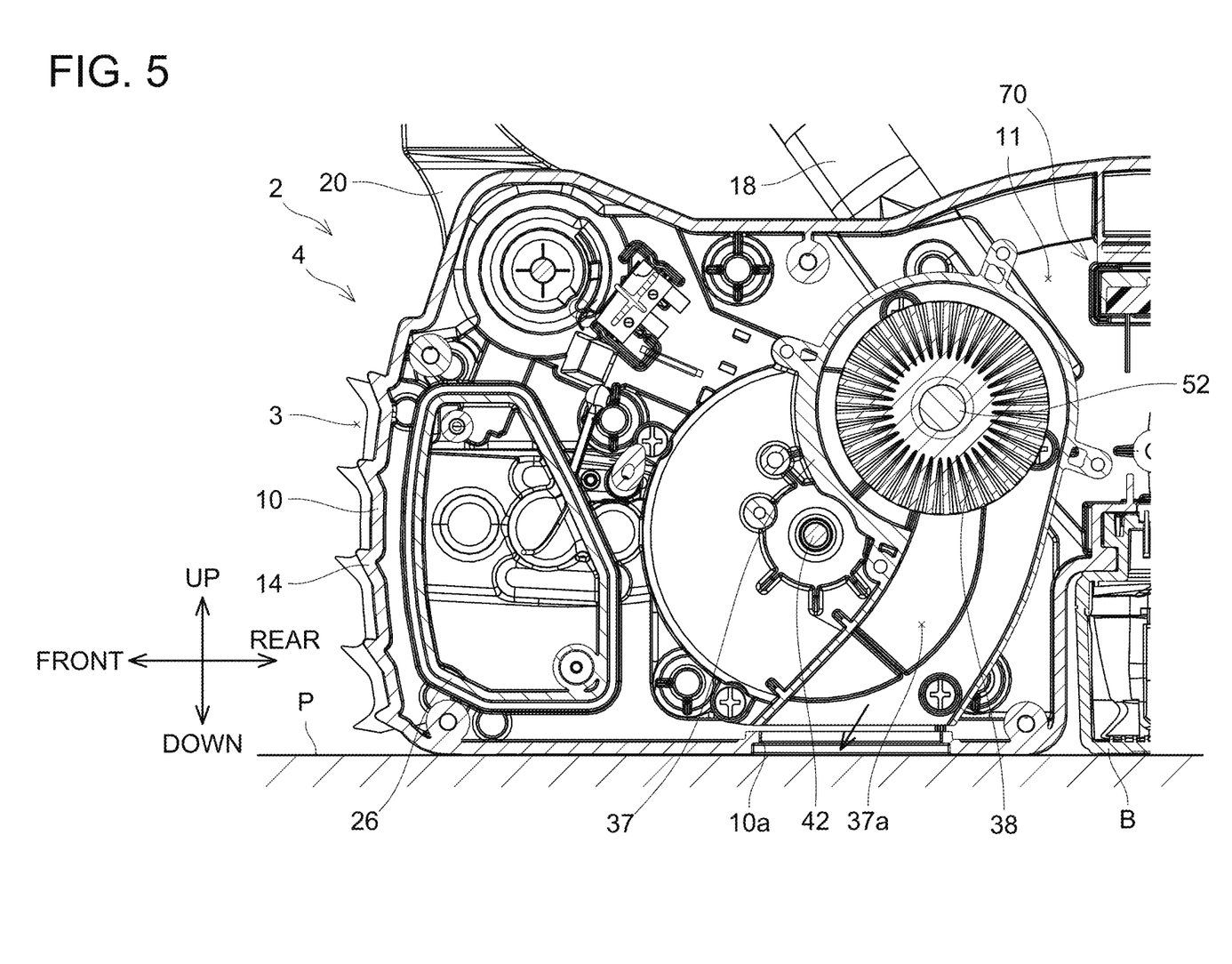
FIG. 5 is a vertical cross-sectional view of the working machine 2 according to the embodiment in the vicinity of a fan 38.

A discharge passage 37a is defined between the motor housing 36 and the cover member 37. The discharge passage 37a is in communication with an inner space of the motor housing 36 via the second air holes 36b. As illustrated in FIG. 5, the discharge passage 37a is in communication with a space outside the working machine 2 via a discharge opening 10a defined in a lower wall of the housing 10. Hereinafter, the space outside the working machine 2 is termed an outer space 3.

The fan 38 fits with the motor shaft 52. The fan 38 is positioned in the discharge passage 37a. The fan 38 rotates when the motor shaft 52 rotates, and thereby air flows downward.

Figure 6:
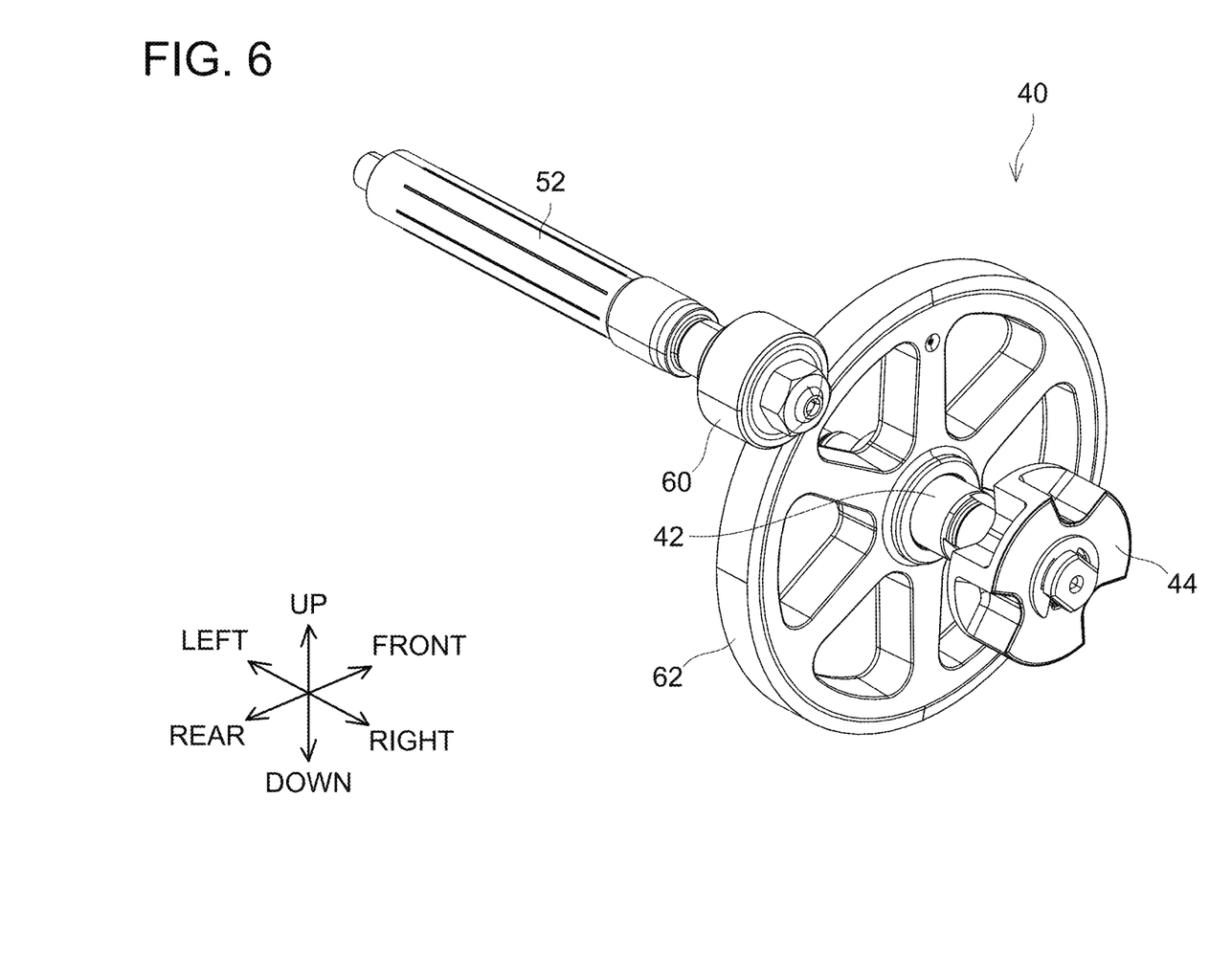
FIG. 6 is a perspective view of the transmission mechanism 40, an intermediate shaft 42, and a sprocket 44 of the working machine 2 according to the embodiment.

As illustrated in FIG. 6, the transmission mechanism 40 comprises a first gear 60 and a second gear 62. The first gear 60 fits with a right end portion of the motor shaft 52. The first gear 60 meshes with the second gear 62. A rotation axis of the second gear 62 is positioned below and forward of a rotation axis of the first gear 60.

The intermediate shaft 42 is inserted in the second gear 62. As illustrated in FIG. 4, the intermediate shaft 42 is disposed along the right-left direction. The intermediate shaft 42 is supported by the cover member 37 via a bearing 64 such that the intermediate shaft is rotatable with respect to the cover member 37 and is also supported by the housing 10 via a bearing 66 such that the intermediate shaft 42 is rotatable with respect to the housing 10.

The sprocket 44 fits with a right end portion of the intermediate shaft 42. The saw chain 8 hangs over the sprocket 44 from the guide bar 6. When the motor 34 is driven, the first gear 60 rotates with the rotation of the motor shaft 52, and thus the second gear 62 rotates. Then, the sprocket 44 rotates together with the intermediate shaft 42. Thus, the saw chain 8 moves along the sprocket 44 and the periphery of the guide bar 6.

Figure 7:
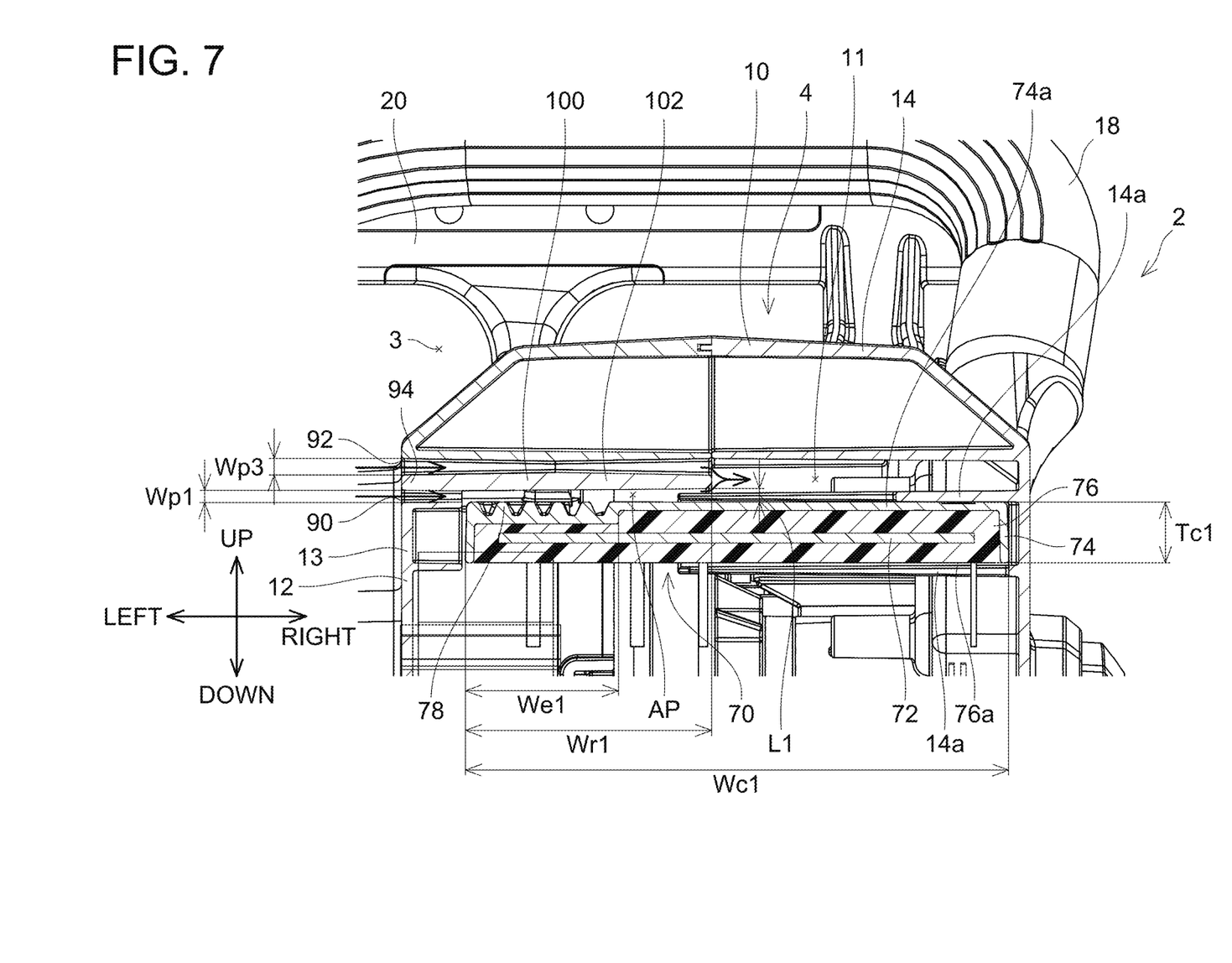
FIG. 7 is a transverse cross-sectional view of the working machine 2 according to the embodiment in the vicinity of a control unit 70.
Figure 8:
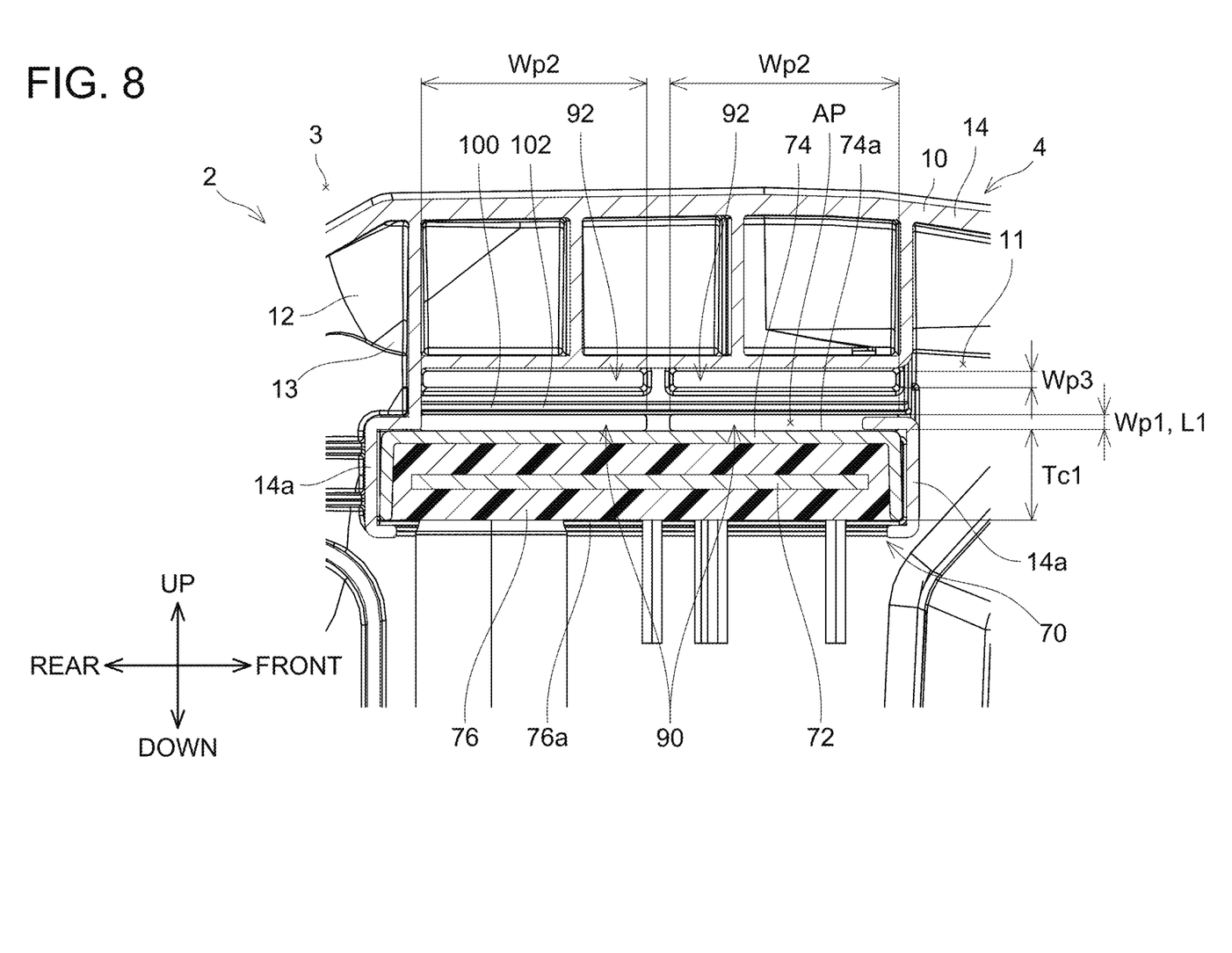
FIG. 8 is a longitudinal cross-sectional view of the working machine 2 according to the embodiment in the vicinity of the control unit 70.

As illustrated in FIG. 7, the working machine 2 comprises the control unit 70. The control unit 70 is fixed to the right housing 14. Specifically, the right housing 14 comprises a fixed rib 14a extending leftward from an inner surface of the right housing 14. As illustrated in FIG. 8, the fixed rib 14a contacts the control unit 70 from both above and below. As illustrated in FIG. 7, the control unit 70 is disposed on a plane along the right-left direction and the front-rear direction.

The control unit 70 comprises a circuit board 72, a case 74, and a potting material 76. The circuit board 72 is disposed on a plane substantially perpendicular to the left wall of the left housing 12. Here, the plane substantially perpendicular to the left wall of the left housing 12 includes a plane inclined with respect to the left wall of the left housing 12 at an angle of 1.5 degrees or less. The circuit board 72 is housed in the case 74. The circuit board 72 comprises a plurality of switching elements (not illustrated) and a microcomputer (not illustrated). The switching elements are, for example, IGBTs or MOSFETs. The microcomputer controls the motor 34 by switching the switching elements between an on-state and an off-state.

The case 74 has a box shape with its bottom opened. An upper surface 74a of the case 74 defines an upper surface of the control unit 70. Hereinafter, the upper surface of the control unit 70 may be denoted with reference sign 74a. The upper surface 74a of the case 74 is perpendicular to the up-down direction. The case 74 is constituted of, for example, a metal material (e.g., aluminum). In a variant, the case 74 may be constituted of, for example, a resin material. The case 74 comprises a heat dissipating part 78. The heat dissipating part 78 is arranged at a left portion of the upper surface 74a of the case 74. The heat dissipating part 78 has a concave-convex shape in which a plurality of projections is defined in a recess in the upper surface 74a of the case 74. In the up-down direction, a portion of an inner surface of the case 74 corresponding to the region where the heat dissipating part 78 is arranged is closer to the circuit board 72 than a portion of the inner surface of the case 74 corresponding to a region where the heat dissipating part 78 is not arranged. Thus, heat of the circuit board 72 is likely to transfer to the heat dissipating part 78. A width We1 of the heat dissipating part 78 in the right-left direction is more than 20% of a width Wc1 of the case 74 in the right-left direction. In the present embodiment, the width We1 is 30% of the width Wc1.

The potting material 76 is constituted of, for example, a resin material. The potting material 76 in a melting state is poured into the case 74 and solidifies, and thereby disposed in the case 74. The potting material 76 encloses the circuit board 72. A lower surface 76a of the potting material 76 defines a lower surface of the control unit 70. Hereinafter, the lower surface of the control unit 70 may be denoted with reference sign 76a.

As illustrated in FIG. 2, two first apertures 90 and two second apertures 92 are defined in the left wall of the left housing 12. Hereinafter, the left wall of the left housing 12 may be termed a partition wall 13. The partition wall 13 is disposed on a plane along the up-down direction and the front-rear direction. The first apertures 90 and the second apertures 92 are positioned forward of the rear handle 16 and above the battery pack B. The first apertures 90 and the second apertures 92 penetrate the partition wall 13 in the right-left direction. Thus, the first apertures 90 and the second apertures 92 communicate the outer space 3 with the inner space 11 (see FIG. 7). The two first apertures 90 are aligned in the front-rear direction. The two second apertures 92 are aligned in the front-rear direction. Each of the second apertures 92 is positioned above its corresponding first aperture 90. The first apertures 90 each have a rectangular shape in which a width Wp1 of the first aperture 90 in the up-down direction is smaller than a width Wp2 thereof in the front-rear direction. The second apertures 92 each have a rectangular shape in which a width Wp3 of the second aperture 92 in the up-down direction is smaller than the width Wp2 thereof in the front-rear direction. As illustrated in FIG. 7, the two first apertures 90 and the two second apertures 92 are positioned above the upper surface 74a of the case 74. The width Wp1 of the first apertures 90 in the up-down direction and the width Wp3 of the second apertures 92 in the up-down direction are each 50% or less of a thickness Tc1 of the case 74 in the up-down direction (i.e., the distance between the upper surface 74a of the case 74 and the lower surface 76a of the potting material 76). In the present embodiment, the width Wp1 and the width Wp3 are each 20% of the thickness Tc1. This prevents entry of foreign matters, such as chips, into the inner space 11 through the first apertures 90 and the second apertures 92. As illustrated in FIG. 8, in the front-rear direction, a front end of the control unit 70 is at substantially the same position as a front end of the front first aperture 90. In the front-rear direction, a rear end of the control unit 70 is positioned rearward of a rear end of the rear first aperture 90.

As illustrated in FIG. 7, the working machine 2 further comprises a rib 100. The rib 100 is disposed in the inner space 11. The rib 100 extends rightward from the partition wall 13. The partition wall 13 separates the inner space 11 from the outer space 3. The rib 100 extends substantially parallel to the right-left direction. Here, the rib 100 extending substantially parallel to the right-left direction includes that the rib 100 is inclined in the right-left direction at an angle of 1.5 degrees or less. This facilitates removal of a mold when the rib 100 is formed by resin molding. In a variant, the rib 100 may be inclined with respect to a plane along the right-left direction and the front-rear direction at an angle of 10 degrees or less. In the right-left direction, the rib 100 extends up to the vicinity of a border between the left housing 12 and the right housing 14. In the present embodiment, the width of the rib 100 in the right-left direction is larger than twice the thickness of the partition wall 13 in the right-left direction. The rib 100 is integrated with the partition wall 13. In a variant, the rib 100 may be fixed to the partition wall 13 with a bolt or the like. In the up-down direction, the rib 100 is connected with a portion 94 of the partition wall 13 between the first apertures 90 and the second apertures 92. The rib 100 defines a lower space between the rib 100 and the upper surface 74a of the case 74 and an upper space between the rib 100 and an upper inner surface of the left housing 12. Each of the lower space and the upper space is a part of the inner space 11. The lower space is in communication with the outer space 3 via the first apertures 90. The upper space is in communication with the outer space 3 via the second apertures 92. In the up-down direction, the rib 100 partially overlaps the case 74. Hereinafter, the portion of the rib 100 that overlaps the case 74 is termed a facing portion 102.

The facing portion 102 faces the upper surface 74a of the case 74 and the heat dissipating part 78. A distance L1 between the facing portion 102 and the upper surface 74a of the case 74 is substantially constant in the right-left direction. The distance L1 is smaller than the thickness Tc1 of the case 74. A width Wr1 of the facing portion 102 in the right-left direction is 30% or more of the width Wc1 of the case 74 in the right-left direction. In the present embodiment, the width Wr1 is 45% of the width Wc1. Further, the facing portion 102 faces ⅓ or more (i.e., 33% or more) of the area of the upper surface 74a of the case 74. In the present embodiment, the facing portion 102 faces 40% of the area of the upper surface 74a of the case 74. As illustrated in FIG. 8, the width of the facing portion 102 in the front-rear direction is substantially equal to the distance from the rear ends of the rear first apertures 90 to the front ends of the front first apertures 90. The distance from upper ends of the second apertures 92 to the upper surface 74a of the case 74 is 100% or less of the thickness Tc1 of the case 74, and in the present embodiment, this distance is 80% of the thickness Tc1.

Next, how air flows when the fan 38 rotates is described. When the fan 38 (see FIG. 3) rotates, negative pressure is generated on the left side of the fan 38. This causes air in the outer space 3 to flow into the inner space 11 through both the two first apertures 90 and the two second apertures 92, as illustrated in FIG. 7. In the drawings, directions of the air flow are indicated by arrows. The air flowing in through the first apertures 90 flows through the lower space, i.e., an air passage AP between the facing portion 102 and the upper surface 74a of the case 74, and then flows to the inner space 11 positioned rightward of the tip of the facing portion 102. Since the heat dissipating part 78 is exposed to the air passage AP, the heat of the control unit 70 is dissipated from the heat dissipating part 78 to the air while the air is flowing along the heat dissipating part 78. Thus, the control unit 70 is cooled. Further, the air flowing in through the second apertures 92 flows through the upper space, i.e., between the facing portion 102 and the upper inner surface of the left housing 12. Then, this air flows to the inner space 11 positioned rightward of the tip of the facing portion 102 and joins the air from the air passage AP. The temperature of the joined air is lower than the temperature of the air that has flowed through the air passage AP. The joined air changes its flow direction forward and flows toward the motor housing 36 (see FIG. 3).

As illustrated in FIG. 3, the joined air flows along an outer surface of the motor housing 36 and then flows into the motor housing 36 through the first air holes 36a. Then, the air flows inside the motor 34 (i.e., between the stator 50 and the rotor 51). While the air is flowing inside the motor 34, heat of the motor 34 is dissipated to the air, and thus the motor 34 is cooled. Then, the air flows into the discharge passage 37a through the second air holes 36b. As illustrated in FIG. 5, the air in the discharge passage 37a is pushed downward by the rotation of the fan 38. This air is then discharged to the outer space 3 through the discharge opening 10a of the housing 10.

Effects

The working machine 2 according to the present embodiment comprises the motor 34 configured to drive the sprocket 44 and the saw chain 8; the fan 38 configured to be driven by the motor 34 and generate an air flow inside the inner space 11; the control unit 70 disposed inside the inner space 11; the partition wall 13 separating the inner space 11 from the outer space 13; the first apertures 90 defined in the partition wall 13 and communicating the inner space 11 with the outer space 3; and the rib 100 extending from the partition wall 13 inside the inner space 11 and defining the air passage AP in which the air flows between the control unit 70 and the rib 100. The control unit 70 comprises the circuit board 72 configured to control actuation of the motor 34 and the case 74 housing the circuit board 72. The control unit 70 includes the upper surface 74a facing the rib 100. In the up-down direction perpendicular to the upper surface 74a, the rib 100 and the upper surface 74a at least partially overlap with each other. In the up-down direction, the distance L1 between the rib 100 and the upper surface 74a is smaller than the thickness Tc1 of the case 74.

In the configuration above, when the fan 38 rotates, air in the outer space 3 flows into the inner space 11 through the first apertures 90. Then, the air flows up to the motor 34 through the air passage AP between the rib 100 and the upper surface 74a of the control unit 70. According to the configuration above, the distance L1 between the rib 100 and the upper surface 74a is smaller than the thickness Tc1 of the case 74 in the up-down direction. This configuration can thus increase the flow velocity of the air flowing between the rib 100 and the upper surface 74a as compared to a configuration in which the distance L1 between the rib 100 and the upper surface 74a is larger than the thickness Tc1 of the case 74 in the up-down direction. Since heat transference is increased, the cooling capability for the control unit 70 can be enhanced.

The control unit 70 further comprises the heat dissipating part 78 for heat dissipation. The heat dissipating part 78 is exposed to the air passage AP.

In the configuration above, heat of the control unit 70 is dissipated to the air flowing through the air passage AP via the heat dissipating part 78. Thus, this configuration can enhance the cooling capability for the control unit 70 as compared to a configuration in which the control unit 70 does not comprise the heat dissipating part 78.

The heat dissipating part 78 has a concave-convex shape.

This configuration provides a large contact area between the air and the heat dissipating part 78 as compared to a configuration in which the heat dissipating part 78 does not have a concave-convex shape, and thus can enhance the cooling capacity for the control unit 70.

The rib 100 is disposed substantially parallel to the upper surface 74a.

For example, a configuration in which the rib 100 is inclined toward the upper surface 74a cannot provide a long air passage AP because the length of the rib 100 needs to be adjusted such that the distance between the rib 100 and the upper surface 74a does not fall below a certain distance. To the contrary, in a configuration in which the rib 100 is inclined away from the upper surface 74a, the distance between the rib 100 and the upper surface 74a is gradually increased, and thus the flow velocity of the air flowing in through the first apertures 90 decreases as the air flows through the air passage AP. The configuration above can prevent the decrease in the flow velocity of the air flowing in through the first apertures 90 and provide a long air passage AP since the rib 100 is disposed substantially parallel to the upper surface 74a.

The rib 100 comprises the facing portion 102 that faces ⅓ or more of the area of the upper surface 74a.

In the configuration above, the upper surface 74a can be cooled over a large area by the air flowing in through the first apertures 90.

The rib 100 is integrated with the partition wall 13.

The configuration above allows for a reduced number of components as compared to a configuration in which the rib 100 is separate from the partition wall 13.

The control unit 70 is disposed along a plane substantially perpendicular to the partition wall 13.

If the control unit 70 is not disposed along a plane substantially perpendicular to the partition wall 13, the air flowing in through the first apertures 90 has to make a turn to flow through the air passage AP between the rib 100 and the upper surface 74a. This turn of air flow reduces the flow velocity of the air. In the configuration above, the air flowing in through the first apertures 90 does not need to make a turn to flow through the air passage AP between the rib 100 and the upper surface 74a. Thus, it is possible to prevent a reduction in the flow velocity of the air.

The outer space 3 is a space outside of the working machine 2.

The configuration above allows relatively low-temperature air outside of the working machine 2 to flow into the inner space 11 through the first apertures 90. Thus, the cooling capability for the control unit 70 can be enhanced.

The width Wp1 of the first apertures 90 is smaller than the thickness Tc1 of the case 74 in the up-down direction.

There may be foreign matters in areas where the working machine 2 is used. In the configuration above, the width Wp1 of the first apertures 90 is smaller than the thickness Tc1 of the case 74 in the up-down direction, and thus it is possible to prevent entry of foreign matters into the inner space 11 through the first apertures 90.

The working machine 2 further comprises the second apertures 92 defined in the partition wall 13 and communicating the inner space 11 with the outer space 3. The rib 100 is connected with the portion 94 of the partition wall 13 between the first apertures 90 and the second apertures 92.

For example, in a configuration in which only the first apertures 90 are defined in the partition wall 13, the air flowing in through the first apertures 90 cools the control unit 70, and then the air warmed as a result of the cooling of the control unit 70 flows toward the motor 34. Thus, the motor 34 may not be sufficiently cooled. In the configuration above, the air flowing in through the second apertures 92 flows toward the motor 34 without coiling the control unit 70 since the rib 100 is disposed between the first apertures 90 and the second apertures 92. Thus, it is possible to enhance the cooling capability for the control unit 70 by the air flowing in through the first apertures 90 and also enhance the cooling capability for the motor 34 by the air flowing in through the second apertures 92.

The working machine 2 comprises the guide bar 6, the sprocket 44 configured to be rotated by the motor 34, and the saw chain 8 configured to move along the periphery of the guide bar 6 as the sprocket 44 rotates.

In the configuration above, when the saw chain 8 cuts an object, a large load is applied to the motor 34 and a large current flows through the circuit board 72. Accordingly, the circuit board 72 generates a large amount of heat, and thus the control unit 70 is likely to have a high temperature. The above configuration allows for a constant contact between the air with fast flow velocity and the upper surface 74a of the case 74 of the control unit 70 with a high temperature. Since heat transference is increased, the cooling capability can be enhanced for the control unit 70 with a high temperature.

(Corresponding Relationships)

The sprocket 44 and the saw chain 8 are an example of the "working part". The inner space 11 and the outer space 3 are examples of the "first space" and the "second space", respectively. The upper surface 74a is an example of the "first surface". The up-down direction is an example of the "first direction".

In an embodiment, the heat dissipating part 78 may be separate from the case 74. The heat dissipating part 78 may be detachably attached to the case 74.

In an embodiment, the rib 100 may not be disposed substantially parallel to the upper surface 74a of the case 74.

In an embodiment, the control unit 70 may not be disposed along a plane substantially perpendicular to the partition wall 13.

In an embodiment, the second space may not be the outer space 3. In this case, the working machine 2 may further comprise a cover member disposed outside the left housing 12, and the second space may be a space defined between the left housing 12 and the cover member.

In an embodiment, the partition wall 13 may be devoid of the second apertures 92.

In an embodiment, the working machine 2 is not limited to a chain saw, and may be, for example, a hedge trimmer or a blower.

What is claimed is:

1. A working machine comprising:
    a motor configured to drive a working part;
    a fan configured to be driven by the motor and generate an air flow inside a first space;
    a control unit disposed inside the first space;
    a partition wall separating the first space from a second space;
    a first aperture defined in the partition wall and communicating the first space with the second space; and
    a rib extending from the partition wall inside the first space and defining an air passage in which the air flow passes, wherein the air passage is positioned between the control unit and the rib,
    wherein
    the control unit comprises:
        a circuit board configured to control actuation of the motor, and
        a case housing the circuit board,
    the control unit includes a first surface facing the rib,
    in a first direction perpendicular to the first surface, the rib and the first surface at least partially overlap with each other, and
    a distance between the rib and the first surface is smaller than a thickness of the case in the first direction.

2. The working machine according to claim 1, wherein the control unit further comprises a heat dissipating part for heat dissipation, and the heat dissipating part is exposed to the air passage.

3. The working machine according to claim 2, wherein the heat dissipating part has a concave-convex shape.

4. The working machine according to claim 1, wherein the rib is disposed substantially parallel to the first surface.

5. The working machine according to claim 4, wherein the rib comprises a facing portion that faces ⅓ or more of an area of the first surface.

6. The working machine according to claim 1, wherein the rib is integrated with the partition wall.

7. The working machine according to claim 1, wherein the control unit is disposed along a plane substantially perpendicular to the partition wall.

8. The working machine according to claim 1, wherein the second space is a space outside of the working machine.

9. The working machine according to claim 1, wherein a width of the first aperture is smaller than the thickness of the case in the first direction.

10. The working machine according to claim 1, further comprising a second aperture defined in the partition wall and communicating the first space with the second space, wherein the rib is connected with a portion of the partition wall between the first aperture and the second aperture.

11. The working machine according to claim 1, further comprising a guide bar,
    wherein the working part comprises:
        a sprocket configured to be rotated by the motor; and
        a saw chain configured to move along a periphery of the guide bar as the sprocket rotates.

12. The working machine according to claim 3, wherein the rib is disposed substantially parallel to the first surface,
    the rib comprises a facing portion that faces ⅓ or more of an area of the first surface,
    the rib is integrated with the partition wall,
    the control unit is disposed along a plane substantially perpendicular to the partition wall,
    the second space is a space outside of the working machine, and
    a width of the first aperture is smaller than the thickness of the case in the first direction,
    the working machine further comprises:
        a second aperture defined in the partition wall and communicating the first space with the second space; and
        a guide bar,
    the rib is connected with a portion of the partition wall between the first aperture and the second aperture, and
    the working part comprises:
        a sprocket configured to rotate by the motor; and
        a saw chain configured to move along a periphery of the guide bar as the sprocket rotates.

* * * * *